US011008422B2

(12) United States Patent
Kobilka et al.

(10) Patent No.: US 11,008,422 B2
(45) Date of Patent: May 18, 2021

(54) IMPACT RESISTANT FLAME RETARDANT POLYHEXAHYDROTRIAZINE POLYMERS VIA GENERATION OF POLYHEXAHYDROTRIAZINE MONOMERS AND HEXAHYDRO-1,3,5-TRIAZINE SMALL MOLECULES

(71) Applicant: International Business Machines Corporation, Armonk, NY (US)

(72) Inventors: Brandon M. Kobilka, Fishkill, NY (US); Joseph Kuczynski, North Port, FL (US); Jacob T. Porter, Highland, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/556,563

(22) Filed: Aug. 30, 2019

(65) Prior Publication Data
US 2019/0382529 A1   Dec. 19, 2019

Related U.S. Application Data

(62) Division of application No. 15/673,513, filed on Aug. 10, 2017, now Pat. No. 10,544,264.

(51) Int. Cl.
| | | |
|---|---|---|
| *C08G 73/06* | (2006.01) | |
| *C09K 21/14* | (2006.01) | |
| *C08F 236/06* | (2006.01) | |
| *C08G 12/08* | (2006.01) | |
| *C08F 12/28* | (2006.01) | |
| *C08F 212/14* | (2006.01) | |

(52) U.S. Cl.
CPC .......... *C08G 73/0644* (2013.01); *C08F 12/28* (2013.01); *C08F 212/14* (2013.01); *C08F 236/06* (2013.01); *C08G 12/08* (2013.01); *C08G 73/0638* (2013.01); *C09K 21/14* (2013.01)

(58) Field of Classification Search
CPC .......................... C08G 73/0644; C09K 21/14
USPC ........................................................ 524/610
See application file for complete search history.

(56) References Cited

U.S. PATENT DOCUMENTS

| | | | |
|---|---|---|---|
| 8,686,073 B2 | 4/2014 | Pfaendner et al. | |
| 9,228,034 B1 * | 1/2016 | Boday | C08F 12/30 |
| 9,303,186 B1 | 4/2016 | Boday et al. | |
| 9,453,108 B2 | 9/2016 | Boday et al. | |
| 9,458,299 B1 | 10/2016 | Boday et al. | |
| 9,587,073 B2 | 3/2017 | Boday et al. | |
| 2007/0173563 A1 | 7/2007 | Okoshi et al. | |
| 2008/0103267 A1 | 5/2008 | Hurst et al. | |
| 2012/0184635 A1 | 7/2012 | Eberstaller et al. | |
| 2013/0102703 A1 | 4/2013 | Bar-Yaakov et al. | |
| 2013/0317147 A1 | 11/2013 | Li et al. | |
| 2014/0357769 A1 | 12/2014 | Zheng et al. | |
| 2015/0104579 A1 | 4/2015 | Hedrick et al. | |
| 2015/0361260 A1 | 12/2015 | Mass et al. | |
| 2016/0024254 A1 | 1/2016 | Boday et al. | |
| 2016/0046803 A1 * | 2/2016 | Boday | C08J 5/24 |
| | | | 264/129 |
| 2016/0297931 A1 | 10/2016 | Boday et al. | |
| 2016/0340517 A1 | 11/2016 | Simpson | |
| 2019/0048140 A1 | 2/2019 | Kobilka et al. | |

FOREIGN PATENT DOCUMENTS

| | | |
|---|---|---|
| EP | 2545122 B1 | 12/2015 |
| WO | 2015/103006 A1 | 7/2015 |

OTHER PUBLICATIONS

Boday et al., "Method to Generate Microcapsules with Hexahydrotriazine (HT)-Containing Shells," U.S. Appl. No. 15/465,252, filed Mar. 21, 2017.
"Paraloid™ BPM-520," Dow Products, printed Aug. 7, 2017, pp. 1-2, http://www.dow.com/en-us/markets-and-solutions/products/PARALOIDBPM/PARALOIDBPM520.
List of IBM Patents or Patent Applications Treated as Related, Signed Aug. 30, 2019, 2 pages.

* cited by examiner

*Primary Examiner* — Hui H Chin
(74) *Attorney, Agent, or Firm* — Kelsey M. Skodje

(57) ABSTRACT

An impact resistant polyhexahydrotriazine polymer, processes of forming an impact resistant polyhexahydrotriazine polymer, and an article of manufacture comprising an impact resistant polyhexahydrotriazine polymer are disclosed. The impact resistant polyhexahydrotriazine polymer includes at least one hexahydrotriazine group and at least one chain comprising an allylic portion and a styrenic portion. Variations in the chain control properties of the impact resistant polymer. The process of forming the impact resistant polyhexahydrotriazine polymer includes reactions between formaldehyde and at least two classes of monomer that form hexahydrotriazine groups and impact resistant chains. Adjusting relative monomer concentrations controls properties of the impact resistant polyhexahydrotriazine polymer. The article of manufacture contains a material that has an impact resistant polymer. Impact resistance of the impact resistant polyhexahydrotriazine polymer is dependent upon variation in relative amounts of monomers used in its synthesis.

7 Claims, 13 Drawing Sheets

IMPACT RESISTANT FLAME RETARDANT POLYHEXAHYDROTRIAZINE POLYMERS VIA GENERATION OF POLYHEXAHYDROTRIAZINE MONOMERS AND HEXAHYDRO-1,3,5-TRIAZINE SMALL MOLECULES

BACKGROUND

The present disclosure relates to impact resistant flame retardant polyhexahydrotriazine (PHT) polymers and, more specifically, impact resistant flame retardant PHT polymers formed by polymerization of polyhexahydrotriazine (PHT) monomers and hexahydro-1,3,5-triazine (HT) small molecules.

Polyhexahydrotriazine (PHT) polymers are a class of high-strength thermosetting polymers with high elastic moduli, solvent resistance, heat resistance, and resistance to environmental stress cracking. PHT polymers have self-healing capabilities, and can be recycled using a strong acid. Additionally, PHT polymers can be blended with flame retardant additives in order to provide flame retardant properties to the polymer.

SUMMARY

Various embodiments are directed to an impact resistant polymer comprising at least one hexahydrotriazine group and at least one chain comprising an allylic portion and a styrenic portion, which can be a polyaminostyrene portion. Variations in the chain, such as relative lengths of the allylic and styrenic portions, can control properties of the impact resistant polymer, such as degree of cross-linking and impact resistance. The at least one chain can also comprise a flame retardant portion, which can be a phosphorus-containing portion. Additional embodiments are directed to a process of forming an impact resistant polyhexahydrotriazine polymer. The process can include providing variable amounts of at least two classes of monomer and formaldehyde. The monomers can include at least one aromatic amine, which can be an amino-functionalized diphenyl ether compound. The amino group can react with the formaldehyde to produce at least one hexahydrotriazine group. Additionally, molecules of the at least two classes of monomer can react to form impact resistant chains. The at least two classes of monomer can include a flame retardant monomer, which can be selected from a group consisting of phosphorus-containing compounds, melamine compounds, halogens, dianiline compounds, and halogen-containing compounds. The at least two classes of monomer can also include monomers selected from a group consisting of allylic monomers and styrenic monomers. The process can also include adjusting relative monomer concentrations, which can control properties of the impact resistant polyhexahydrotriazine polymer. Further embodiments are directed to an article of manufacture comprising an impact resistant material containing an impact resistant polyhexahydrotriazine polymer, wherein impact resistance of the polyhexahydrotriazine polymer is dependent upon the relative amount and identity of monomers in the polyhexahydrotriazine polymer. The impact resistant polyhexahydrotriazine polymer can include flame retardant monomers, and be flame retardant. The impact resistant material can be a recyclable semiconducting material or a plastic. The impact resistant polyhexahydrotriazine polymer can be blended with a material selected from a group consisting of polyhemiaminal, a carbon filler, an epoxy, a polyhydroxyurethane, a polycarbonate, a polyester, a polyacrylate, a polyimide, a polyamide, a polyurea, and a poly(vinyl-ester).

DETAILED DESCRIPTION

Polyhexahydrotriazine (PHT) polymers are thermosetting polymers with wide-ranging applications. For example, PHT polymers can be used as components of automotive and other devices, such as body parts and electronic components (e.g., enclosures, insulation, semiconductors, etc.). PHT polymers have properties that include high elastic moduli, the ability to self-heal, recyclability, and resistance to solvents, high temperatures, and environmental cracking stress. PHT polymers are also lightweight, and can have a Young's modulus of about 8-14 GPa, which can exceed that of bone (approximately 9 GPa).

Flame retardant additives and/or impact resistant additives are often blended with PHT polymers, causing the polymers to require additional processing. The additives are frequently in the form of small molecules or particles, and require loading levels of up to 30%. However, the presence of additives in the PHT polymer can change properties of the polymer in undesirable ways. For example, flame retardant additives can compromise the mechanical properties of the PHT polymer, and impact resistant additives can cause the flame retardancy of the PHT polymer to be reduced. Additionally, when materials containing PHT polymers and additives are disposed of (e.g., in a landfill), the additives can leach into the surrounding environment and cause harm to exposed organisms. Further, the additional processing of the polymer materials that is required in order to blend the additive can be costly and time consuming.

According to some embodiments of the present disclosure, PHT polymers with flame retardant and/or impact resistant substituents are synthesized by polymerizing PHT monomers or hexahydro-1,3,5-triazine (HT) small molecules. For simplicity, hexahydro-1,3,5-triazine groups are referred to herein as hexahydrotriazine (or HT) groups. Each PHT polymer contains at least one hexahydrotriazine group having the structure

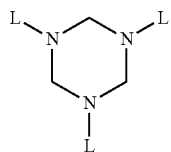

wherein L represents additional components of the polymer. These components are discussed in greater detail below. The PHT polymers disclosed herein provide flexibility, recyclability, durability, impact resistance, and flame retardancy without the need for additives. These properties can be tuned by adjusting the type and relative amounts of different monomers and substituents, as well as by blending the PHT polymers with other petroleum-based or renewable polymers.

Figure 1A:
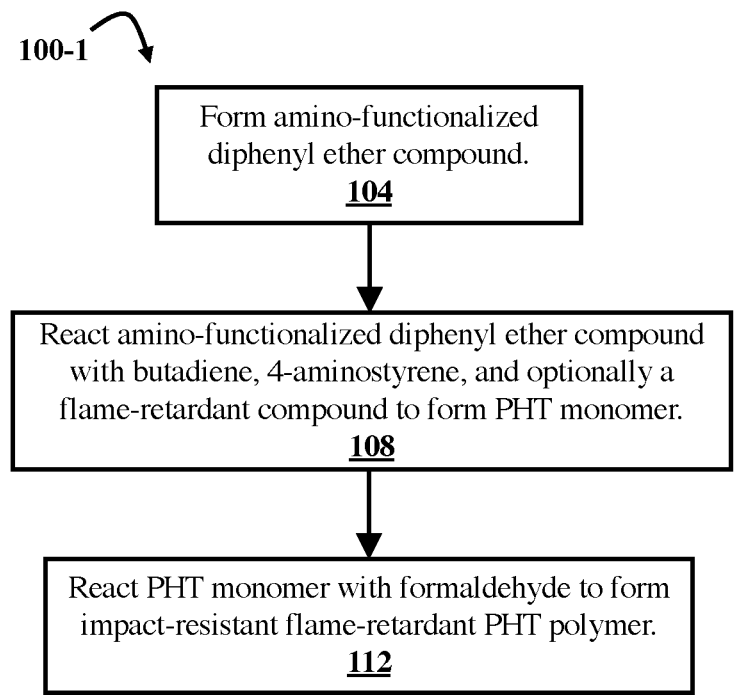
FIG. 1A is a flow diagram illustrating a process of forming an impact resistant flame retardant polyhexahydrotriazine (PHT) polymer derived from a PHT monomer, according to some embodiments of the present disclosure.

FIG. 1A is a flow diagram illustrating a process 100-1 of forming an impact resistant flame retardant polyhexahydrotriazine (PHT) polymer derived from a PHT monomer, according to some embodiments of the present disclosure. Process 100-1 begins with the formation of an amino-functionalized diphenyl ether compound. This is illustrated at step 104. The amino-functionalized diphenyl ether compound is a member of a class of monomers having aromatic amino groups. The amino functional group on the amino-functionalized diphenyl ether compound participates in subsequent reactions to form hexahydrotriazine groups. The amino-functionalized diphenyl ether compound also has an acrylate functional group that participates in subsequent reactions to form polymeric chains, as is discussed in greater detail below. The structures and syntheses of amino-functionalized diphenyl ether compounds are discussed in greater detail with respect to FIGS. 2A, 2B, and 4A.

It should be noted that the amino-functionalized diphenyl ethers discussed herein can be replaced by other monomers. In some embodiments, any small molecule, oligomer, or polymer containing an aromatic amino group can be used. The aromatic amino group-containing monomer (referred to herein as an aromatic amine) can have mono-, di-, tri-, tetra-, or pentaamine functionality. Additionally, the aromatic amine can be monocyclic or polycyclic, and can have bridging groups, polymeric segments, and additional functional groups, such as aromatic, aliphatic, acyl, vinyl functional groups, and inorganic groups (e.g., phosphates, sulfates, halides, hydroxyls, etc.). In some embodiments, a mixture of two or more different aromatic amines can be used.

Further, functional groups on the aromatic amine can participate in additional chemical reactions, transformations, or interactions, which can include synthesis, decomposition, single and/or double replacement, oxidation/reduction, acid/base, nucleophilic, electrophilic and radical substitutions, addition/elimination reactions, and polymerization reactions. It should be noted that, though the synthesis of the amino-functionalized diphenyl ether is discussed herein, the amino-functionalized diphenyl ether or alternate aromatic amines can be obtained commercially in some embodiments.

Process 100-1 continues with a reaction between the amino-functionalized diphenyl ether compound, butadiene, 4-aminostyrene, and optionally a phosphorus-containing flame retardant compound. This is illustrated at step 108. The reaction forms a monomer that can react further to form a PHT polymer. This monomer is referred to herein as a PHT monomer. The reaction with butadiene, 4-aminostyrene, and the phosphorus-containing flame retardant compound forms a polymeric chain attached to the amino-functionalized diphenyl ether compound. The butadiene and 4-aminostyrene provide allylic and styrenic portions of the chain, respectively. The styrenic portion provided by 4-aminostyrene can also be referred to as a polyaminostyrene portion. This reaction is discussed in greater detail with respect to FIG. 4A. The polymeric chain provides impact resistance and flame retardancy. However, in some embodiments, flame retardant monomers are not included, and the polymeric chain provides only impact resistance.

The PHT monomer is reacted with formaldehyde to form the PHT polymer. This is illustrated at step 112. A reaction between the amino groups on the PHT monomer and formaldehyde produces hexahydrotriazine groups. In some embodiments, formaldehyde is replaced by paraformaldehyde. The number of hexahydrotriazine groups formed affects the impact resistance of the PHT polymer, as is discussed in greater detail below. The number of hexahydrotriazine groups can be controlled by adjusting the amount of 4-aminostyrene relative to the other reactants. The reaction between the PHT monomer and formaldehyde is discussed in greater detail with respect to FIG. 4B.

Figure 1B:
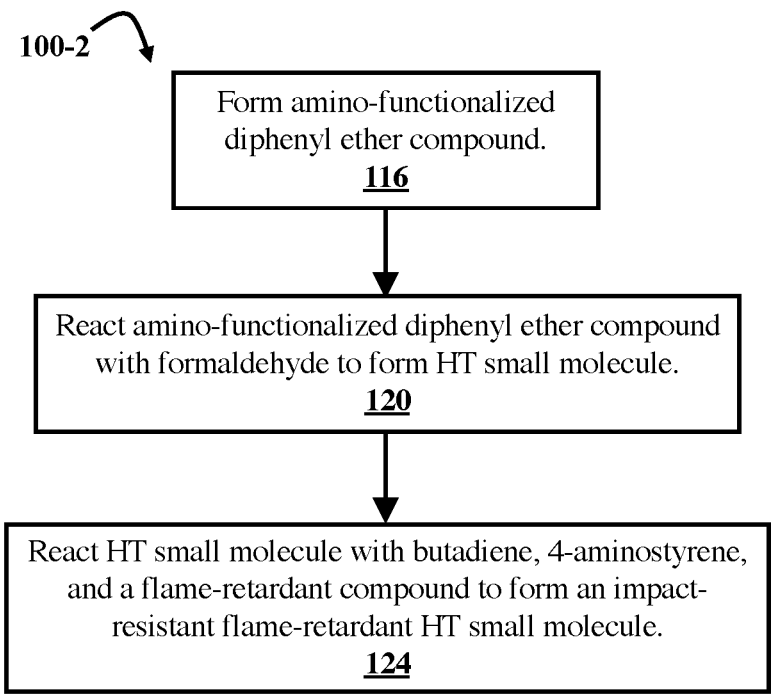
FIG. 1B is a flow diagram illustrating a process of forming an impact resistant flame retardant PHT polymer derived from a hexahydrotriazine (HT) small molecule, according to some embodiments of the present disclosure.

FIG. 1B is a flow diagram illustrating a process 100-2 of forming an impact resistant flame retardant PHT polymer derived from a hexahydrotriazine (HT) small molecule, according to some embodiments of the present disclosure. Process 100-2 begins with the formation of an amino-functionalized diphenyl ether compound. This is illustrated at step 116. The amino-functionalized diphenyl ether compound has an amino functional group and a hydroxyl group protected by a tert-butyldimethylsilyl (TBS) protecting group. The structure and synthesis of this amino-functionalized diphenyl ether compound are discussed in greater detail with respect to FIG. 1 (step 104) and FIG. 2A.

The amino-functionalized diphenyl ether compound is converted into the HT small molecule. This is illustrated at step 120. The amino-functionalized diphenyl ether compound with a protected hydroxy group is reacted with formaldehyde to form the HT small molecule, as is discussed in greater detail with respect to FIG. 5A. The HT small molecule has a hexahydrotriazine group and three protected hydroxyl groups. One, two, or three of the protecting groups are removed in a subsequent reaction, as is discussed in greater detail with respect to FIG. 5B.

After deprotection, the HT small molecule is reacted with butadiene, 4-aminostyrene, and a flame retardant compound to form an impact resistant flame retardant HT small molecule. This is illustrated at step 124. This reaction forms a chain with allylic, styrenic, and flame retardant portions, respectively. The reactions to form the impact resistant flame retardant HT small molecule are discussed in greater detail with respect to FIGS. 5C and 5D. The impact resistant flame retardant small molecule can be incorporated into other materials, such as other polymers, in order to impart impact resistance and flame retardancy to the materials. In some embodiments, the flame retardant compound is not included.

Figure 2A:
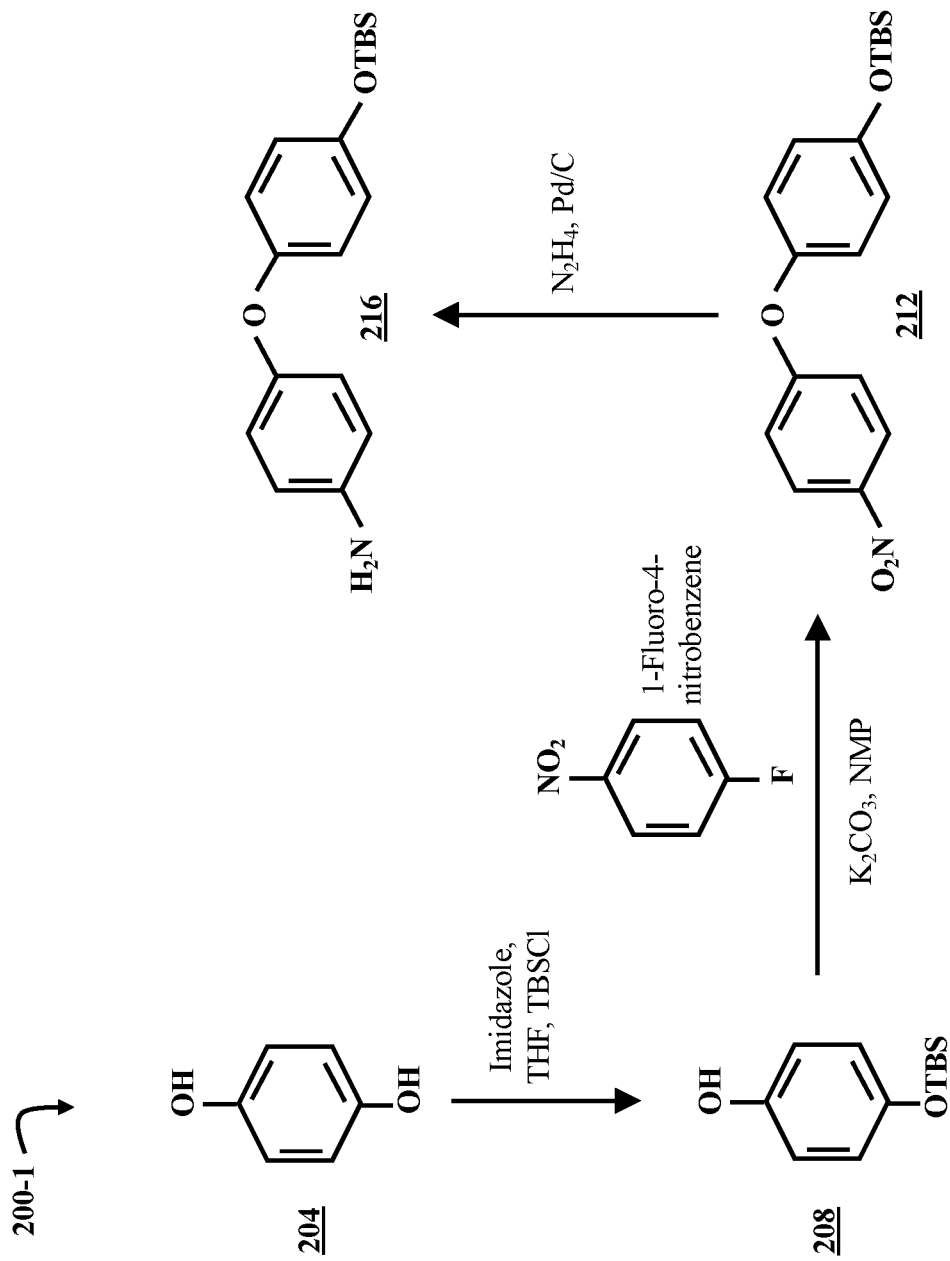
FIG. 2A is a chemical reaction diagram illustrating a process of synthesizing an amino-functionalized protected hydroxyl diphenyl ether compound, according to some embodiments of the present disclosure.

FIG. 2A is a chemical reaction diagram illustrating a process 200-1 of synthesizing an amino-functionalized protected hydroxyl diphenyl ether compound 216, according to some embodiments of the present disclosure. In this synthesis, p-benzenediol 204 is reacted with a protecting reagent in a solution of tetrahydrofuran (THF) and imidazole. The protecting reagent in this example, tert-butyldimethylsilyl chloride (TBSC1), provides a tert-butyldimethylsilyl (TBS) protecting group to one hydroxyl group on the p-benzenediol, replacing a hydrogen atom. In some embodiments, other protecting groups are provided to the hydroxyl group. Examples of alternate protecting groups can include triisopropylsilyl (TIPS), trimethylsilyl (TMS), triethylsilyl (TES), methoxymethyl ether (MOM), and tetrahydropyranyl (THP).

The reaction between the p-benzenediol 204 and the protecting reagent TBSC1 produces a derivative of the benzenediol having a protected hydroxyl group 208 (referred to herein as a protected hydroxyl benzenediol derivative 208). The protected hydroxyl benzenediol derivative 208 is reacted with 1-fluoro-4-nitrobenzene in a solution of N-methyl-2-pyrrolidone (NMP) and potassium carbonate ($K_2CO_3$). Though NMP is used as a solvent in this example and other examples discussed herein, NMP can be replaced by, or used in combination with, other dipolar aprotic solvents or combinations of dipolar aprotic solvents. Examples of these solvents can include dimethylsulfoxide (DMSO), N,N-dimethylformamide (DMF), N,N-dimethylacetamide (DMA), propylene carbonate (PC), propylene glycol methyl ether acetate (PGMEA), etc.

The reaction between the benzenediol derivative 208 and 1-fluoro-4-nitrobenzene forms a nitro-functionalized diphenyl ether compound with a protected hydroxyl group 212 (referred to herein as a protected hydroxyl nitro-functionalized diphenyl ether compound 212). The protected hydroxyl nitro-functionalized diphenyl ether compound 212 is reacted with hydrazine ($N_2H_4$) and a palladium on carbon (Pd/C) catalyst. This reaction reduces the nitro functional group to an amino functional group, producing an amino-functionalized diphenyl ether compound with a protected hydroxyl group 216 (referred to herein as a protected hydroxyl amino-functionalized diphenyl ether compound 216).

Figure 2B:
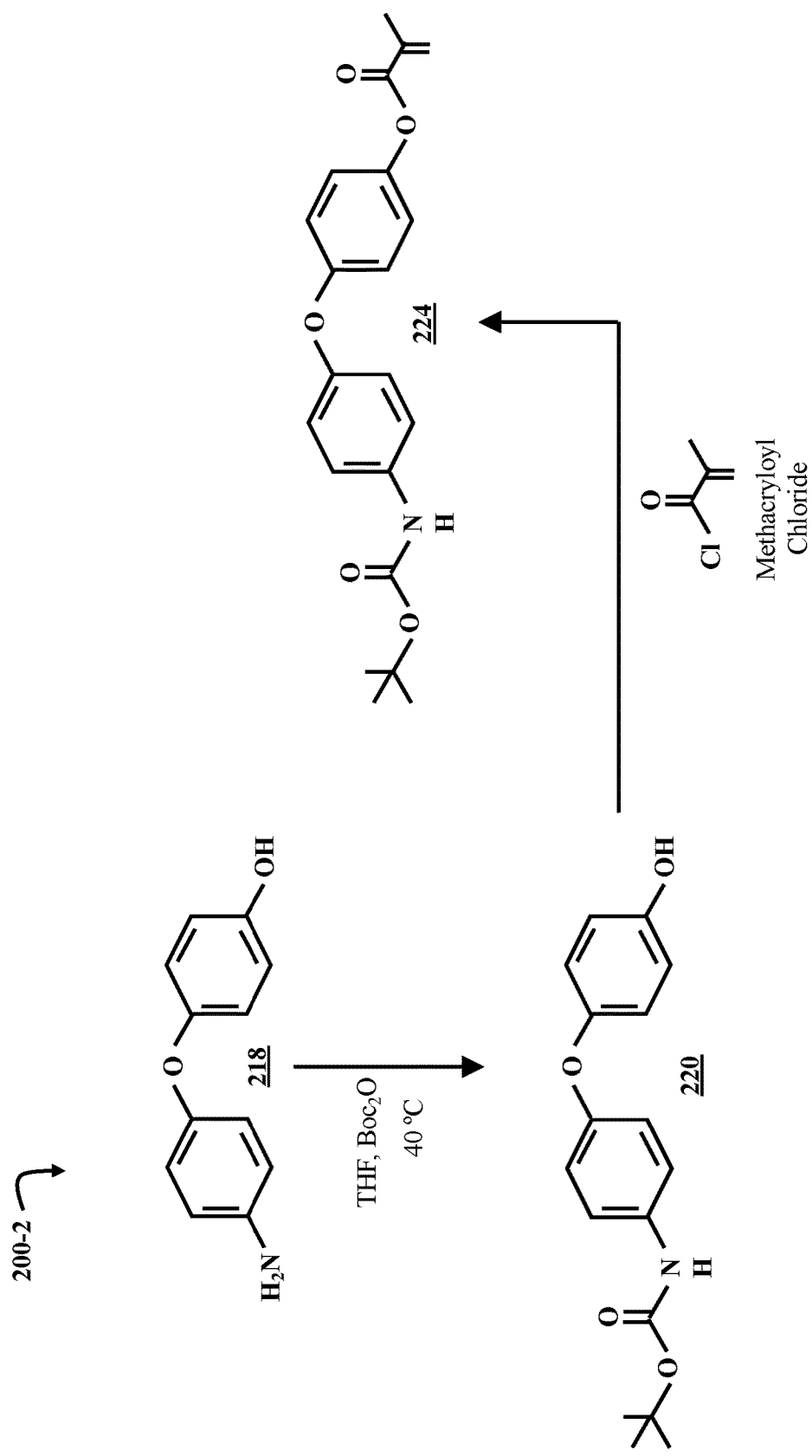
FIG. 2B is a chemical reaction diagram illustrating a process of synthesizing a diphenyl ether compound with amide and acrylate substituents, according to some embodiments of the present disclosure.

FIG. 2B is a chemical reaction diagram illustrating a process 200-2 of synthesizing a diphenyl ether compound with amide and acrylate substituents 224 (referred to herein as an amide acrylate diphenyl ether compound 224), according to some embodiments of the present disclosure. A step prior to process 200-2 involves removing the TBS protecting group from the protected hydroxyl amino-functionalized diphenyl ether compound 216 to form an amino- and hydroxyl-functionalized diphenyl ether compound 218. This step of removing the TBS protecting group is not illustrated in FIG. 2B, but it can be accomplished in various ways. For example, the protecting group can be removed by a reaction with a fluoride compound, such as tetrabutylammonium fluoride (TBAF). The protecting group can also be removed in a reaction with an acid or base.

In the first step of process 200-2, the amino- and hydroxyl-functionalized diphenyl ether compound 218 is combined with di-tert-butyl dicarbonate ($Boc_2O$) in a tetrahydrofuran (THF) solution. The mixture is reacted at a temperature of about 30° C.-50° C. for about 1 minute to about 24 hours. The reaction produces a diphenyl ether compound with a tert-butyl amide group and a hydroxyl group 220 (referred to herein as an amide hydroxyl diphenyl ether compound 220). Methacryloyl chloride is reacted with the amide hydroxyl diphenyl ether compound 220, producing the amide acrylate diphenyl ether compound 224.

Figure 3A:
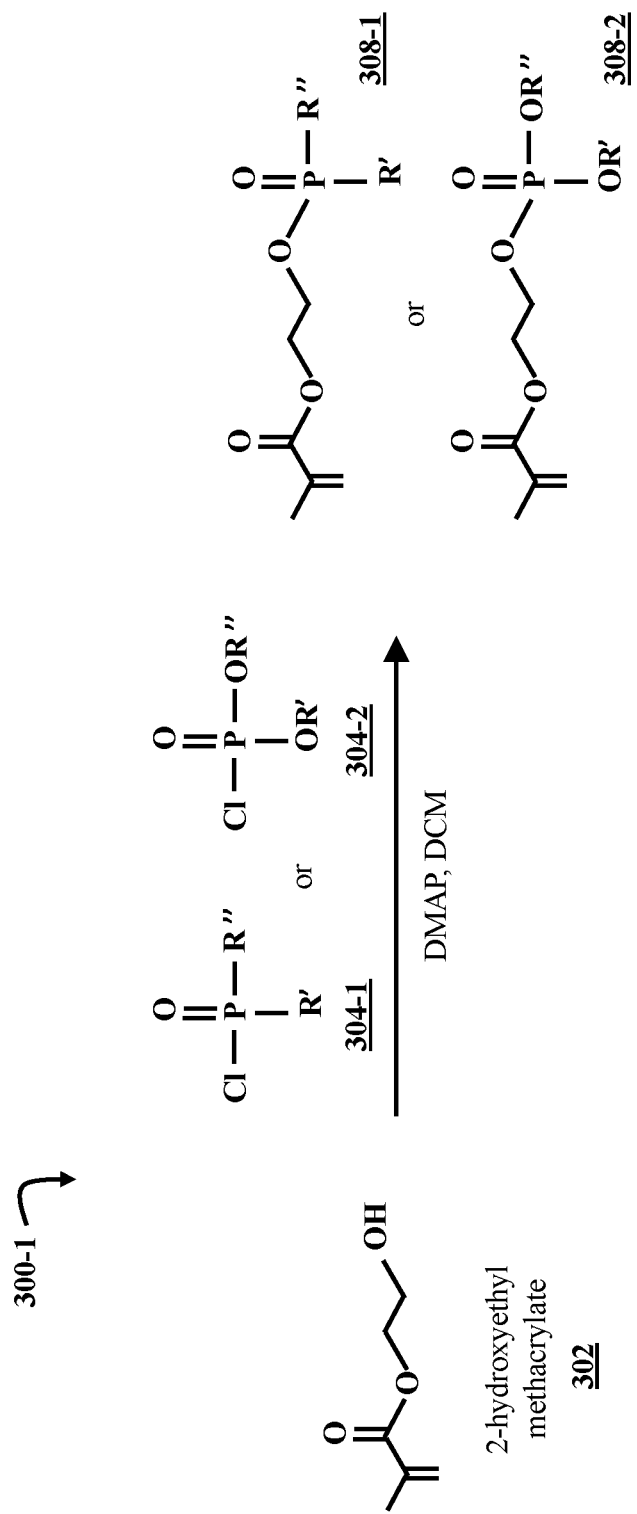
FIG. 3A is a chemical reaction diagram illustrating a process of forming phosphorus-containing acrylates, according to some embodiments of the present disclosure.

FIG. 3A is a chemical reaction diagram illustrating a process 300-1 of forming phosphorus-containing acrylates 308-1 and 308-2, according to some embodiments of the present disclosure. The phosphorus-containing acrylates 308-1 and 308-2 can provide flame retardant groups to the PHT polymers and HT small molecules discussed herein, as is discussed in greater detail with respect to FIGS. 4A and 5D. In process 300-1, 2-hydroxyethyl methacrylate 302 is reacted with a di-substituted phosphinic chloride 304-1 or a di-substituted chlorophosphate 304-2 in a solution containing dimethylaminopyridine (DMAP) and dichloromethane (DCM). When process 300-1 is carried out with the di-substituted phosphinic chloride 304-1, a phosphinic acrylate 308-1 is produced, and when the reaction is carried out with the di-substituted chlorophosphate 304-2, a phosphoryl acrylate 308-2 is produced. The di-substituted phosphinic chloride 304-1 and di-substituted chlorophosphate 304-2 each have variable alkyl or aryl R groups (R' and R"). R' and R" can be identical or different substituents. Examples of aryl R groups can include phenyl, naphthyl, thienyl, indolyl, tolyl, xylyl, etc., and examples of alkyl R groups can include branched or unbranched $C_1$-$C_{22}$ acyclic or cyclic alkyl groups.

Figure 3B:
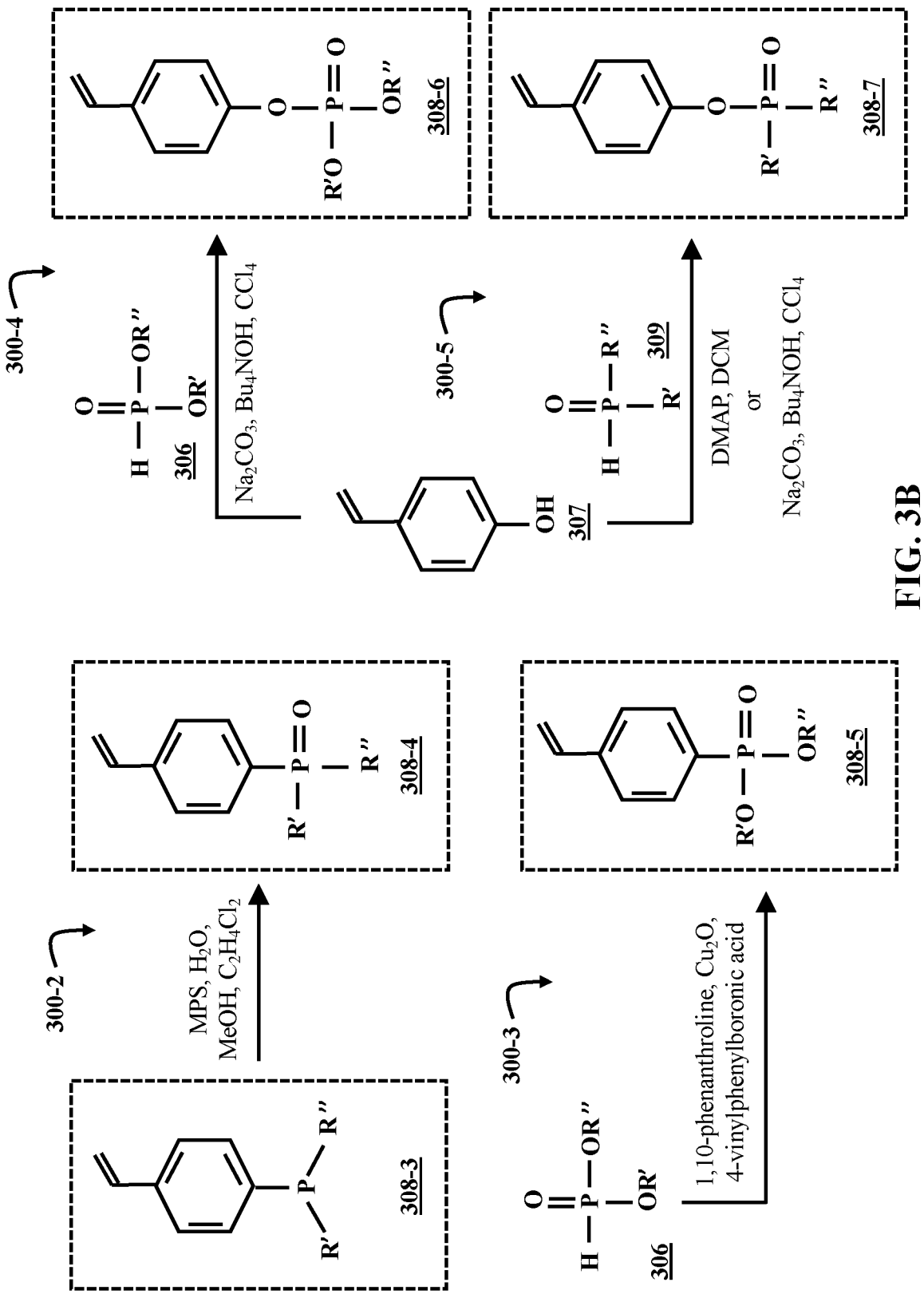
FIG. 3B is a chemical reaction diagram illustrating processes of forming phosphorus-containing styrenes, according to some embodiments of the present disclosure.

FIG. 3B is a chemical reaction diagram illustrating processes 300-2-300-5 of forming phosphorus-containing styrenes 308-3-308-7, according to some embodiments of the present disclosure. The phosphorus-containing styrenes 308-3-308-7 can provide flame retardant groups to the PHT polymers, as discussed in greater detail with respect to FIGS. 4A and 5D. Like the phosphorus-containing acrylates 308-1 and 308-2, each phosphorus-containing styrene 308-3-308-7 has variable R' and R" groups. In process 300-2, a phosphino styrene 308-3 is reacted with potassium peroxymonosulfate (MPS) in a solution of water ($H_2O$), methanol (MeOH), and dichloroethane ($C_2H_4C_{12}$). This oxidation reaction produces a styrenyl phosphine oxide 308-4. In process 300-3, a di-substituted phosphite 306 is combined with 1,10-phenanthroline, copper(I) oxide ($Cu_2O$), and 4-vinylphenylboronic acid. The reaction mixture produces a styrenyl phosphonate 308-5.

Processes 300-4 and 300-5 each employ 4-vinylphenol 307 as a starting material. In process 300-4, a di-substituted phosphite 306 is added to the 4-vinylphenol 307 in a mixture of sodium carbonate ($Na_2CO_3$) and tetrabutylammonium hydroxide ($Bu_4NOH$) dissolved in carbon tetrachloride ($CCl_4$). The reaction mixture produces a styrenyl phosphate 308-6. In process 300-5, a di-substituted phosphine oxide 309 is added to the 4-vinylphenol 307 in either a mixture of dimethylaminopyridine (DMAP) and dichloromethane (DCM) or in a mixture of sodium carbonate ($Na_2CO_3$) and tetrabutylammonium hydroxide (Bu₄NOH) dissolved in carbon tetrachloride (CCl₄). The reaction mixture produces a styrenyl phosphinate 308-7.

Figure 3C:
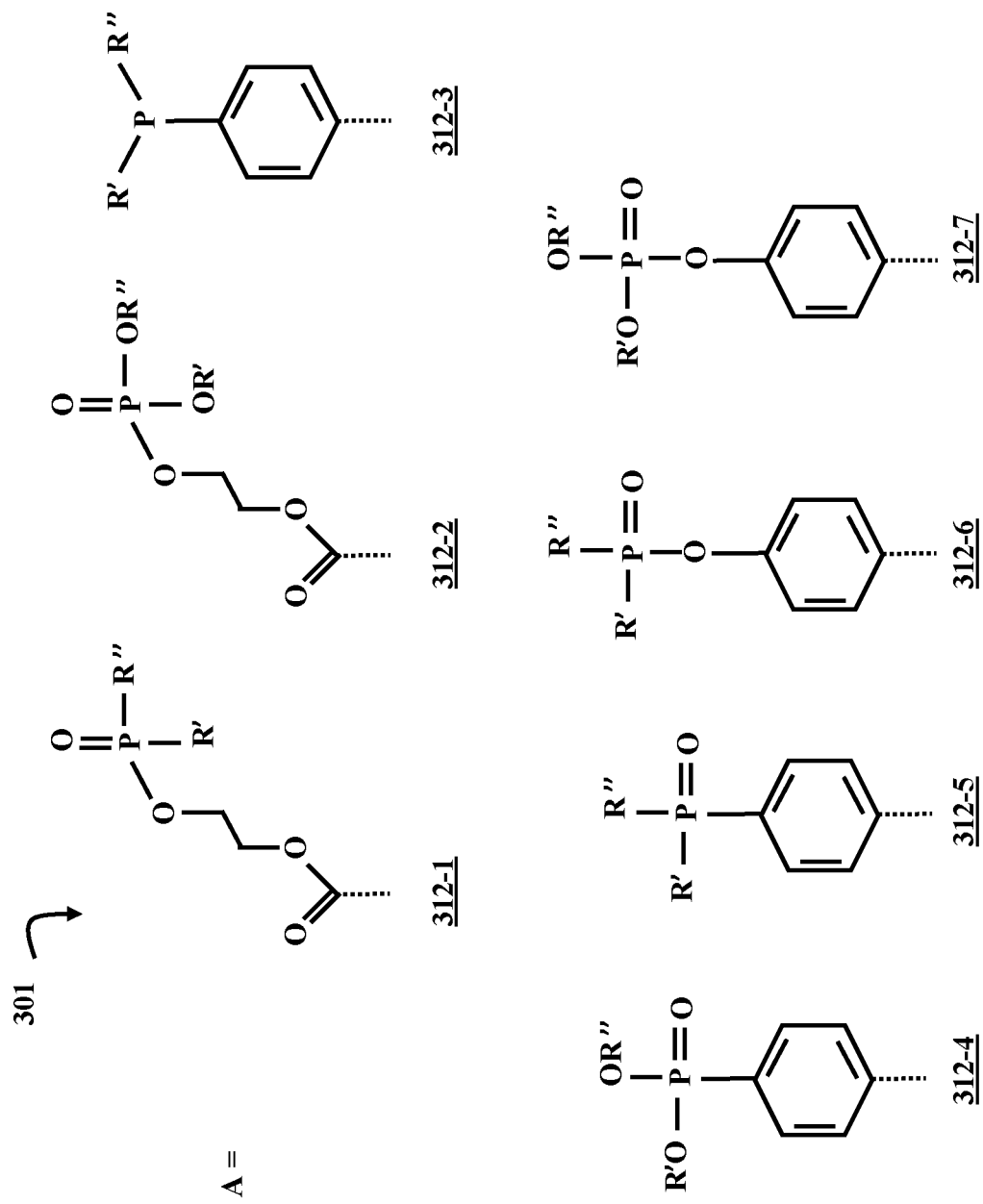
FIG. 3C is a diagrammatic representation of the structures of flame retardant substituents, according to some embodiments of the present disclosure.

FIG. 3C is a diagrammatic representation of the structures 301 of example phosphorus-containing flame retardant substituents 312-1-312-7, according to some embodiments of the present disclosure. These examples are an acrylate phosphinate substituent 312-1, an acrylate phosphate substituent 312-2, a styrenyl phosphine substituent 312-3, a styrenyl phosphonate substituent 312-4, a styrenyl phosphine oxide substituent 312-5, a styrenyl phosphinate substituent 312-6, and a styrenyl phosphate substituent 312-7. The dashed lines represent the locations of bonds to HT small molecules, PHT monomers, or PHT polymers. Herein, the flame retardant substituents 312 are represented by the letter "A" in diagrams of HT small molecules, PHT monomers, and PHT polymers. Each of these substituents 312-1, 312-2, 312-3, 312-4, 312-5, 312-6, and 312-7 (referred to collectively as 312), is bonded to a PHT monomer or HT small molecule in a reaction with a phosphorus-containing compound 308-1, 308-2, 308-3, 308-4, 308-5, 308-6, 308-7 (referred to collectively as 308), respectively. These reactions are discussed in greater detail with respect to FIGS. 4A and 5D.

Figure 4A:
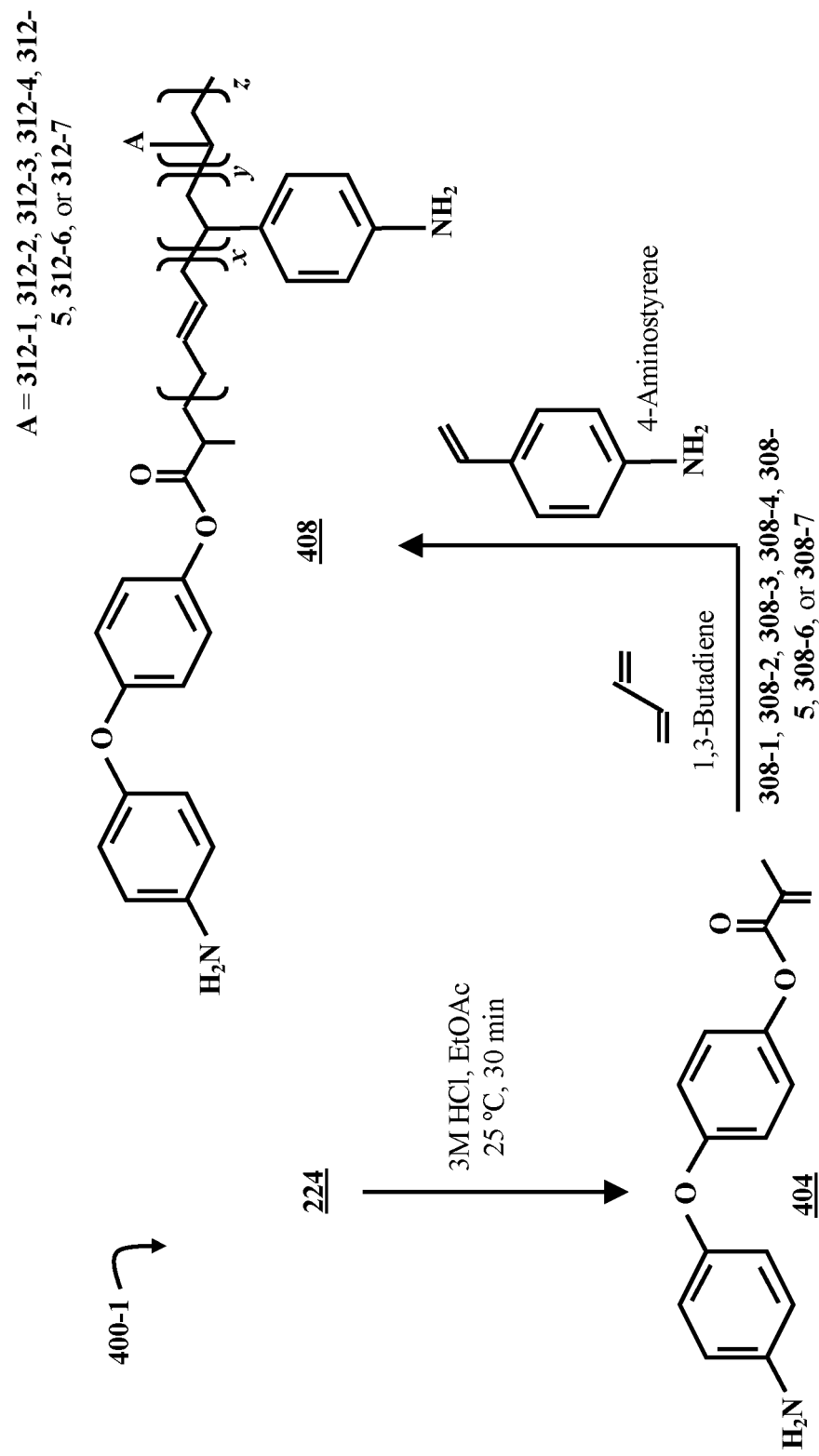
FIG. 4A is a chemical reaction diagram illustrating a process of forming an impact resistant flame retardant monomer (PHT monomer), according to some embodiments of the present disclosure.

FIG. 4A is a chemical reaction diagram illustrating a process 400-1 of forming an impact resistant flame retardant monomer 408, according to some embodiments of the present disclosure. The impact resistant flame retardant monomer 408 is a precursor to a PHT polymer, and is referred to herein as a PHT monomer 408. In the first step of process 400-1, the amide acrylate diphenyl ether compound 224 is combined with 3 molar (M) hydrochloric acid (HCl) and ethyl acetate (EtOAc). The mixture is reacted at approximately 25° C. for approximately thirty minutes, and produces an amino acrylate diphenyl ether compound 404. In the second step of process 400-1, the PHT monomer 408 is produced by reacting the amino acrylate diphenyl ether compound 404 with butadiene, 4-aminostyrene, and phosphorus-containing flame retardant 308 monomers. This step assembles a chain from the butadiene, 4-aminostyrene, and phosphorus-containing flame retardant 308 monomers. The portions of the chain provided by these monomers are referred to herein as the allylic (x), styrenic (y), and flame retardant (z) portions, respectively. The chain formation can be carried out by various polymerization methods, such as reversible addition-fragmentation chain transfer (RAFT) polymerization or radical polymerization techniques, which can include the use of radical initiators such as photoinitiators, thermal initiators, azo compounds, organic or inorganic peroxides, etc.

Figure 4B:
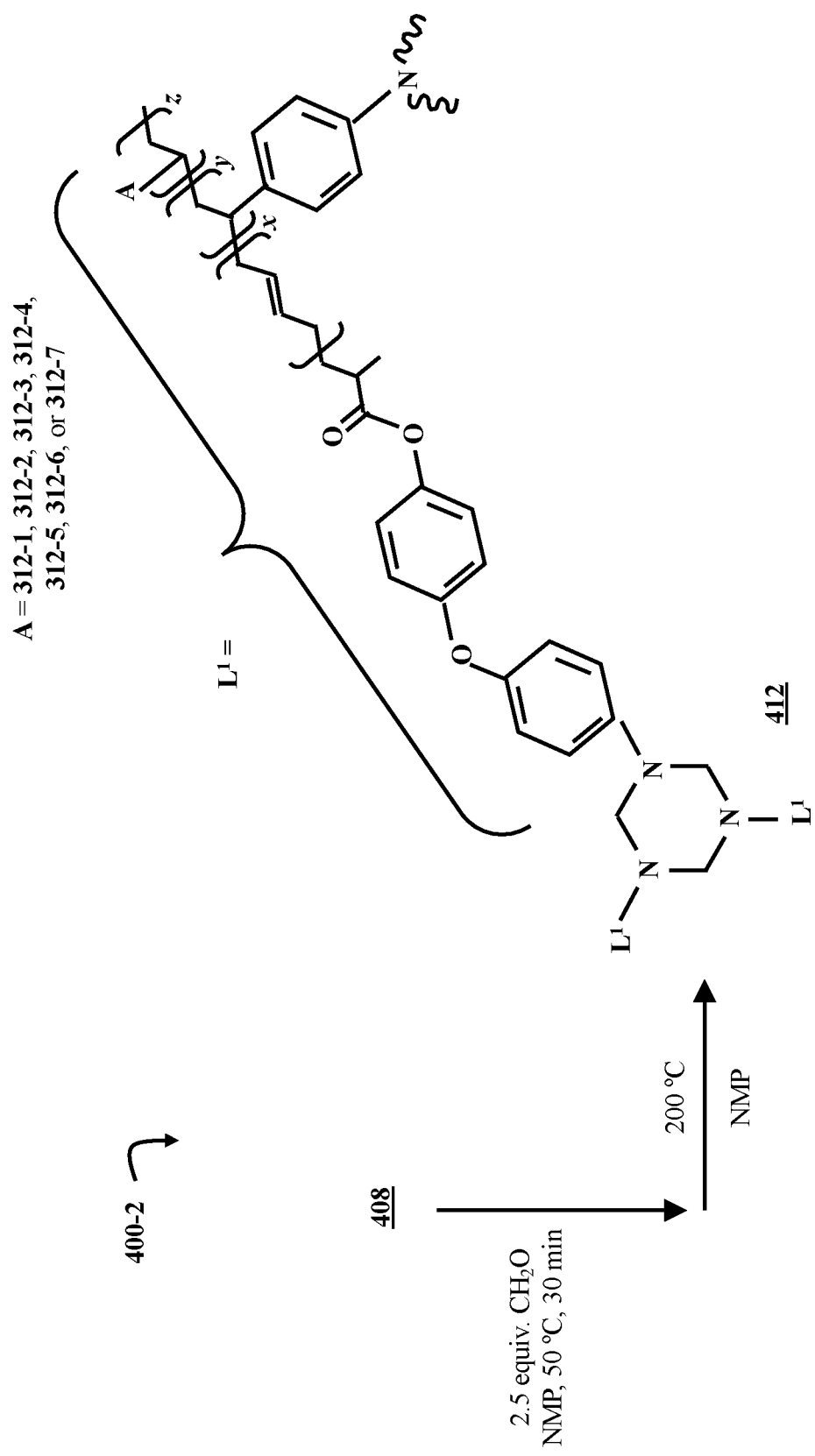
FIG. 4B is a chemical reaction diagram illustrating a process of forming a PHT polymer via polymerization of the PHT monomer, according to some embodiments of the present disclosure.

FIG. 4B is a chemical reaction diagram illustrating a process 400-2 of forming a PHT polymer 412 from polymerization of the PHT monomer 408, according to some embodiments of the present disclosure. In this reaction, the PHT monomer 408 is reacted with 2.5 equivalents of formaldehyde (CH₂O) in N-methyl-2-pyrrolidone (NMP). However, in some embodiments, formaldehyde is replaced by paraformaldehyde. The reaction is carried out at a temperature of approximately 50° C. for approximately thirty minutes. The mixture is then heated to a temperature of approximately 200° C. for approximately one hour, and the PHT polymer 412 is formed. The PHT polymer 412 has multiple hexahydrotriazine groups connected by chains (L¹) of varying length. In the diagrammatic illustration of the PHT polymer 412, a nitrogen (N) having two wavy bonds is a portion of another hexahydrotriazine group. The number of hexahydrotriazine groups and structure of the L¹ chains affects the impact resistance and flame retardancy of the PHT polymer 412.

Figure 5A:
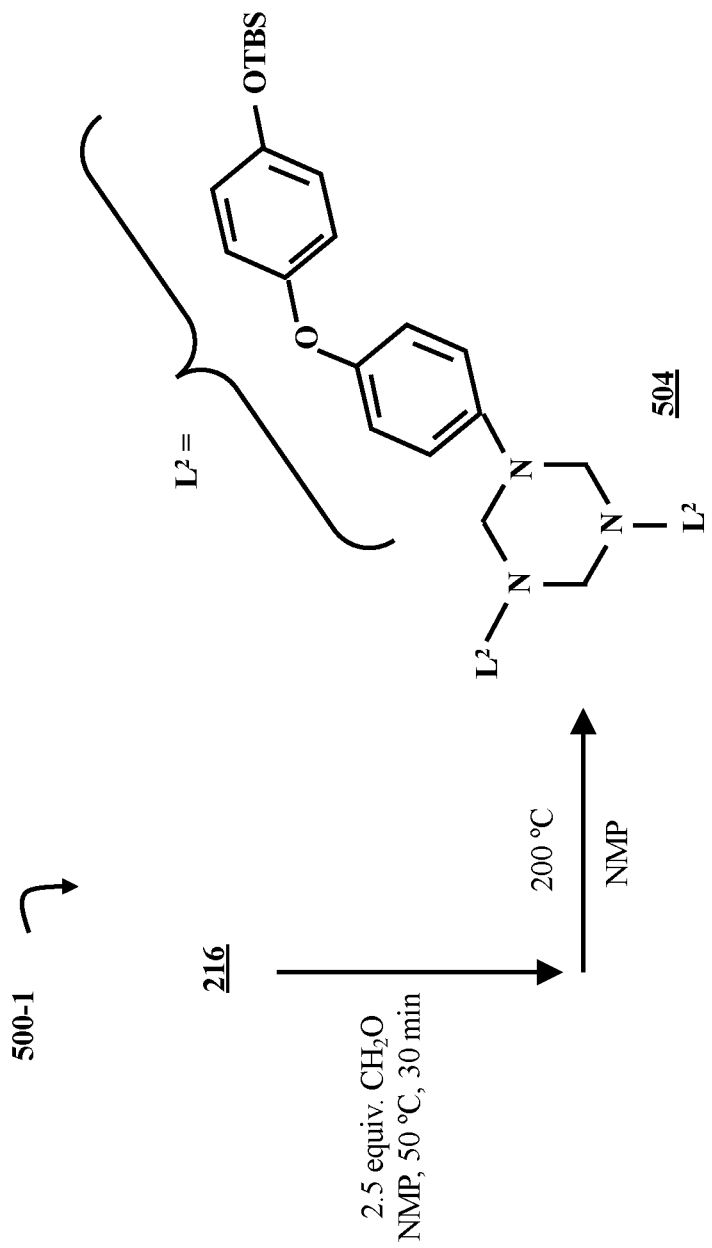
FIG. 5A is a chemical reaction diagram illustrating a process of forming a protected hydroxyl HT small molecule, according to some embodiments of the present disclosure.

FIG. 5A is a chemical reaction diagram illustrating a process 500-1 of forming a protected hydroxyl HT small molecule 504, according to some embodiments of the present disclosure. The reaction to form the protected hydroxyl HT small molecule 504 is carried out under substantially the same conditions as the reaction to form the PHT polymer 412, except for the identity of the amino-functionalized starting material. The reaction to form the PHT polymer 412 uses the PHT monomer 408 as its starting material, and is discussed in greater detail with respect to FIG. 4B. The amino-functionalized starting material for the protected hydroxyl HT small molecule 504 is the protected hydroxyl amino-functionalized diphenyl ether compound 216, which is discussed in greater detail with respect to FIG. 2A. Reacting the protected hydroxyl amino-functionalized diphenyl ether compound 216 with formaldehyde in process 500-1 forms a hexahydrotriazine (HT) group. Each nitrogen (N) in the hexahydrotriazine group is bound to a diphenyl ether group with a protected hydroxyl group (L²). These L² groups are provided by the protected hydroxyl amino-functionalized diphenyl ether compound 216.

Figure 5B:
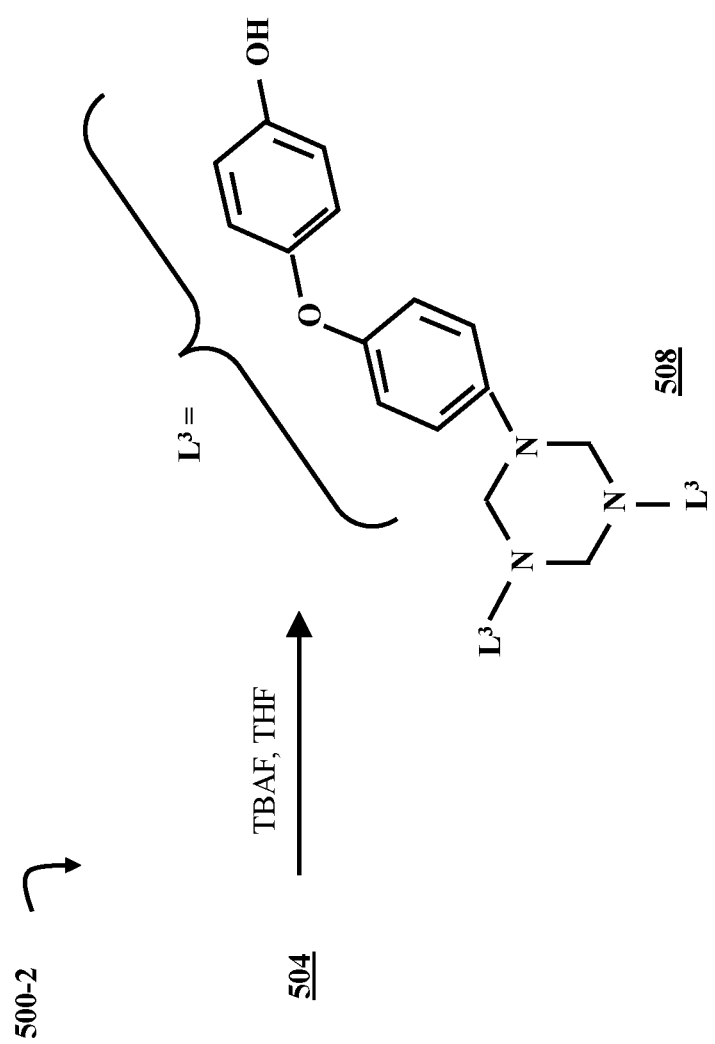
FIG. 5B is a chemical reaction diagram illustrating a process of forming a hydroxy-substituted HT small molecule, according to some embodiments of the present disclosure.

FIG. 5B is a chemical reaction diagram illustrating a process 500-2 of forming a hydroxy-substituted HT small molecule 508, according to some embodiments of the present disclosure. The protected hydroxyl HT small molecule 504 is reacted with tetrabutylammonium fluoride (TBAF) in tetrahydrofuran (THF), producing the hydroxy-substituted HT small molecule 508. The TBS protecting groups can also be removed in a reaction with an acid or a base. In some embodiments, all three TBS protecting groups are removed, but in other embodiments, only one or two protecting groups are removed. In these instances, the number of protecting groups removed can be controlled via stoichiometric conditions.

Figure 5C:
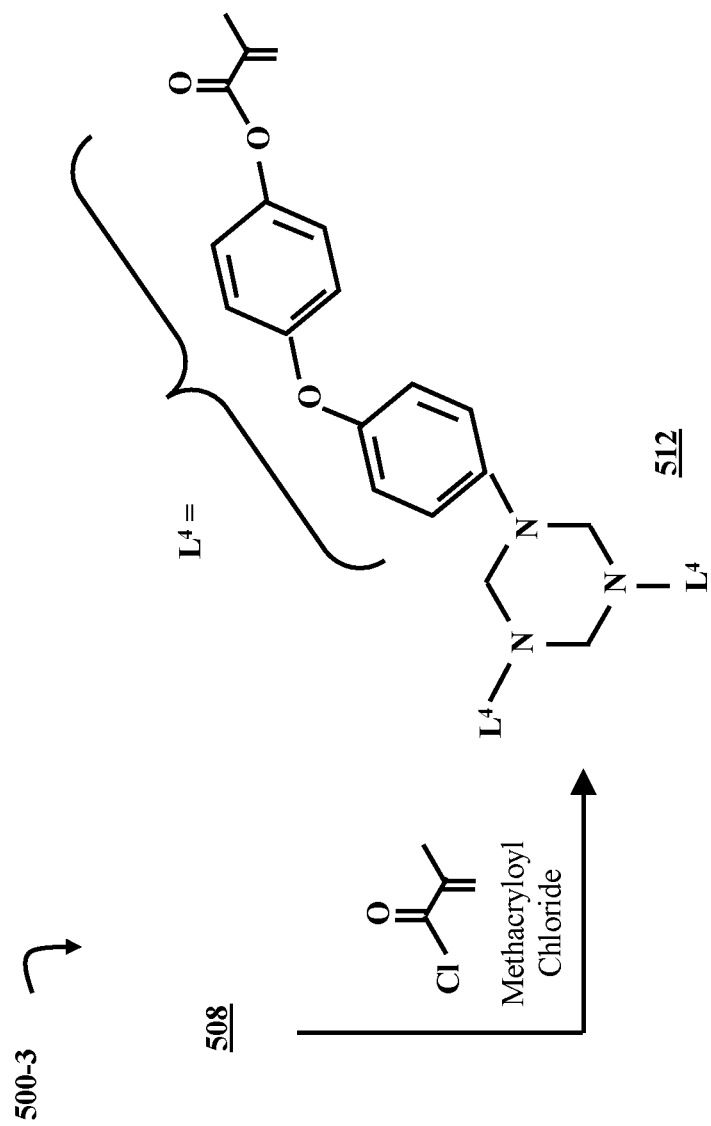
FIG. 5C is a chemical reaction diagram illustrating a process of forming a methyl methacrylate-substituted HT small molecule, according to some embodiments of the present disclosure.

FIG. 5C is a chemical reaction diagram illustrating a process 500-3 of forming a methyl methacrylate-substituted HT small molecule 512, according to some embodiments of the present disclosure. The hydroxy-substituted HT small molecule 508 is reacted with methacryloyl chloride, which produces the methyl methacrylate-substituted HT small molecule 512 via nucleophilic acyl substitution. The methacryloyl chloride reacts with a hydroxyl group on at least one L³ group of the hydroxy-substituted HT small molecule 508. Therefore, depending upon the number of TBS protecting groups removed from the protected hydroxyl HT small molecule 504 in process 500-2, the number of methyl methacrylate-substituted diphenyl ether groups (L⁴) attached to the hexahydrotriazine group will vary. For example, the HT small molecule 512 illustrated herein has three L⁴ groups, but one or two L⁴ groups could be replaced by protected hydroxyl substituted L² groups if the TBS protecting groups are not removed from the protected hydroxyl HT small molecule 504 in process 500-2. In some embodiments, remaining TBS protecting groups can be removed from a partially protected HT small molecule in a reaction with TBAF, acid, or base to form an HT small molecule with two hydroxyl groups and one L⁴ group, one hydroxyl group, one L² group and one L⁴ group, or one hydroxyl group and two L⁴ groups.

Figure 5D:
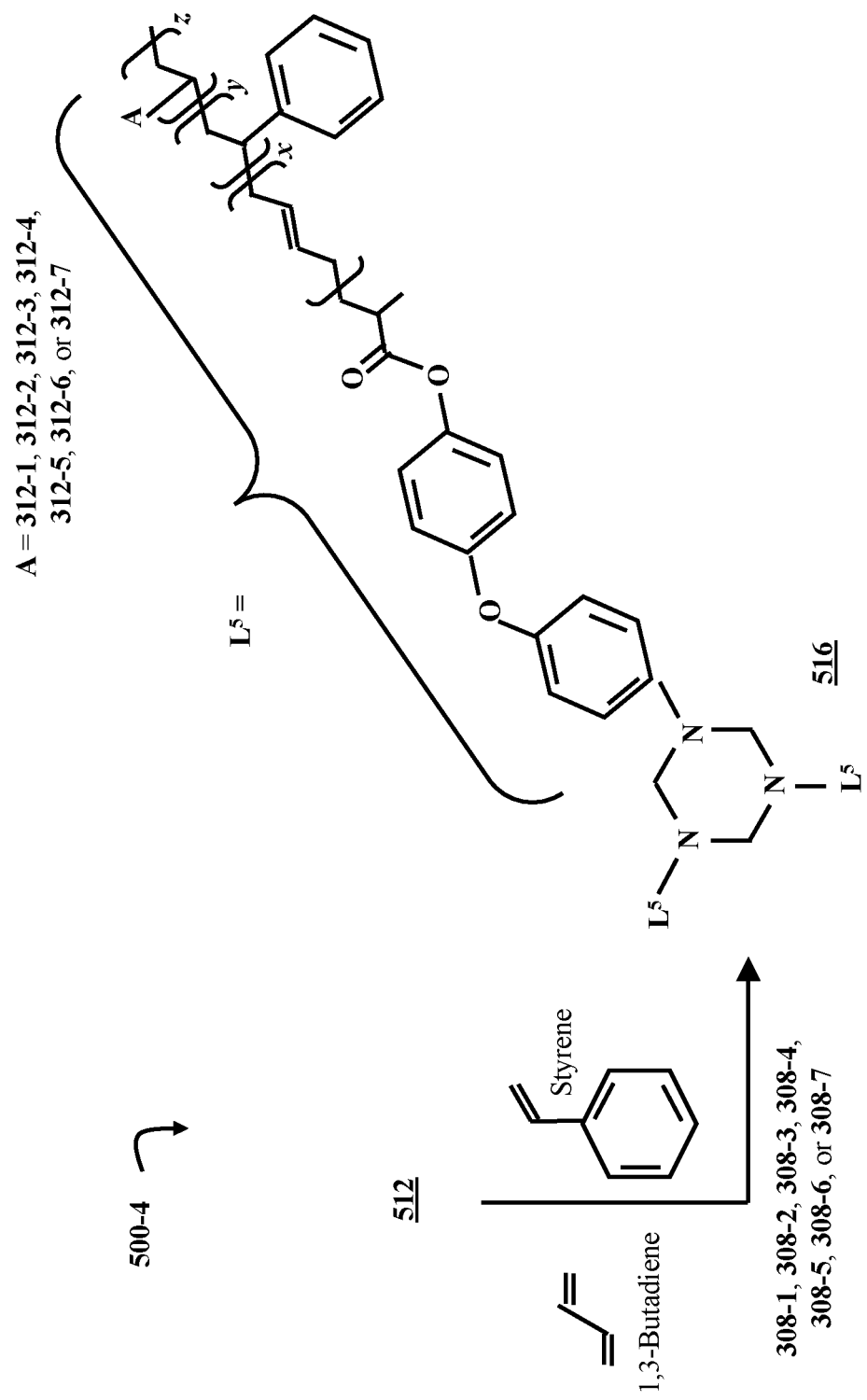
FIG. 5D is a chemical reaction diagram illustrating a process of forming a PHT polymer from an HT small molecule, according to some embodiments of the present disclosure.

FIG. 5D is a chemical reaction diagram illustrating a process 500-4 of forming a PHT polymer 516 from the HT small molecule 512, according to some embodiments of the present disclosure. The reaction to form the HT small molecule-derived PHT polymer 516 builds polymeric chains ($L^5$) onto the diphenyl groups attached to the hexahydrotriazine group of the HT small molecule 512, and is carried out under substantially the same conditions as the process 400-1 of forming the PHT monomer 408, except that 4-aminostyrene is replaced by styrene. Therefore, the styrenic portion of the chain (y) is not a polyaminostyrene portion as in the case of the PHT polymer 412, and does not have an amino functional group to form additional hexahydrotriazine moieties. The PHT polymer 516 derived from the HT small molecule 512 can also be blended with additional polymers, including other PHT polymers. In some embodiments, the flame retardant compound 308 is not included in the reaction, which produces an impact resistant HT small molecule 512 that is not flame retardant.

The properties of the PHT polymers 412 and 516 can be tuned by adjusting the identities and relative amounts of butadiene, styrene, 4-amino styrene, and/or flame retardant 308 monomers in processes 400-1 and 500-4. Adjusting the amounts of these monomers controls the relative lengths of the allylic (x), styrenic (y), and flame retardant (z) portions of the chain. In an example of changes in the relative portion lengths leading to changes in the PHT polymer 412 properties, increasing the ratio of 4-aminostyrene to butadiene can increase the number of hexahydrotriazine groups in the PHT monomer 408 when the amino functional groups from the 4-aminostyrene react with formaldehyde to form hexahydrotriazine groups. Additionally, the double bond in the allylic (x) portion of the chain in the PHT polymers 412 and 516 can be involved in cross-linking. Therefore, increasing the amount of butadiene can lead to an increase in the degree of cross-linking.

Further, monomers with additional functional groups that can be involved in cross-linking (e.g., vinyl, hydroxyl, epoxy, propylene carbonate, acrylate, etc.) can be incorporated into the chain in some embodiments. Varying the amount of hexahydrotriazine groups and/or cross-linking allows the impact resistance, flexibility, strength, and other properties of the polymer to be adjusted. Examples of cross-linking chemistries can include sulfur vulcanization and reactions with peroxides, such as tert-butyl perbenzoate, dicumyl peroxide, benzoyl peroxide, di-tert-butyl peroxide, etc.

The flame retardancy of the PHT polymers 412 and 516 can also be adjusted by varying the reactants in processes 400-1 and 500-4. For example, the relative amount of flame retardant compounds 308 in the reaction can be increased or decreased, thereby increasing or decreasing the flame retardancy of the PHT polymer 412 or 516. Additionally, the identity of the flame retardant phosphorus-containing group (A) 312 is dependent upon the choice of phosphorus-containing flame retardant compound 308 used in the reaction. Different flame retardant groups could also be used, such as groups provided by halogens (e.g., chlorine or bromine), melamine compounds, dianiline compounds, or other phosphorus- or halogen-containing compounds (e.g., acrylic monomers, styrenic monomers, vinylic monomers, etc.). In some embodiments, combinations of two or more varieties of flame retardants are used.

The PHT polymers 412 and 516, PHT monomer 408, or HT small molecule 512 can be combined with different polymers, polymer blends, or other materials, thereby imparting impact resistance and optionally flame retardancy to the polymer or polymer blend. Examples of materials that can be blended with the compounds described herein can include polyhemiaminal, carbon fillers, epoxies, polyhydroxyurethanes, polycarbonates, polyesters, polyacrylates, polyimides, polyamides, polyureas, poly(vinyl-ester)s, etc.

Examples of applications for polymers made, at least in part, from PHT polymers 412 and 516 can include plastics used in electronics hardware (e.g., enclosures, insulation, injection molded parts, etc.), appliances, architecture/construction, furniture, plumbing parts, paints, hospital equipment, toys, coatings, bottles, yarns, sporting goods, etc. PHT polymers 412 and 516 can also be used in automotive, airplane, and spacecraft components (e.g., wings, wing boxes, panels, insulation, electronics, etc.). Additionally, PHT polymers 412 and 516 can be combined with polyhemiaminal (PHA) to make adhesives. Further, PHT polymers 412 and 516 can be used to make semiconductors, which can then be recycled using a strong acid (e.g., sulfuric acid, hydrochloric acid, hydrobromic acid, hydroiodic acid, perchloric acid, nitric acid, etc.). Additional applications can include acoustic dampening, cushioning, synthetic fibers, insulation, etc.

It should be noted that, in some embodiments, the compounds described herein can contain one or more chiral centers. These can include racemic mixtures, diastereomers, enantiomers, and mixtures containing one or more stereoisomer. Further, the disclosed compounds can encompass racemic forms of the compounds in addition to individual stereoisomers, as well as mixtures containing any of these. Temperature and time ranges indicated herein can include the temperature or time on either end of the range, or any temperature or time between these limits.

The synthetic processes discussed herein and their accompanying drawings are prophetic examples, and are not limiting; they can vary in reaction conditions, components, methods, etc. In addition, the reaction conditions can optionally be changed over the course of a process. Further, in some embodiments, processes can be added or omitted while still remaining within the scope of the disclosure, as will be understood by a person of ordinary skill in the art.

What is claimed is:

1. A process of forming an impact resistant polyhexahydrotriazine polymer, comprising:
   providing an aromatic amine monomer;
   providing one or more additional monomers, wherein at least one of the one or more additional monomers is an allylic compound;
   providing formaldehyde;
   forming a hexahydrotriazine compound in a reaction between the formaldehyde and the aromatic amine monomer; and
   reacting the hexahydrotriazine compound with the one or more additional monomers in a polymerization reaction.

2. The process of claim 1, wherein at least one of the one or more additional monomers is a flame retardant monomer.

3. The process of claim 2, wherein the flame retardant monomer is selected from the group consisting of a phosphorus-containing compound, a melamine compound, a halogen, a halogen-containing compound, and a dianiline compound.

4. The process of claim 1, wherein at least one of the one or more additional monomers further comprises a styrenic compound.

5. The process of claim 1, wherein the aromatic amine is an amino-functionalized diphenyl ether compound.

6. The process of claim 1, further comprising blending the impact resistant polyhexahydrotriazine polymer with a material selected from the group consisting of polyhemiaminal, a carbon filler, an epoxy, a polyhydroxyurethane, a polycarbonate, a polyester, a polyacrylate, a polyimide, a polyamide, a polyurea, and a poly(vinyl-ester).

7. The process of claim 4, wherein the providing the one or more additional monomers comprises providing unequal portions of the one or more additional monomers.

\* \* \* \* \*